United States Patent [19]
Stander et al.

[11] Patent Number: 6,098,012
[45] Date of Patent: Aug. 1, 2000

[54] NEURAL NETWORK BASED TRANSIENT FUEL CONTROL METHOD

[75] Inventors: Douglas M. Stander, Grosse Pt. Woods; Sam K. Liu, West Bloomfield; Min Sway-Tin, Troy; William O. Robinson, Detroit, all of Mich.

[73] Assignee: DaimlerChrysler Corporation, Auburn Hills, Mich.

[21] Appl. No.: 09/018,424

[22] Filed: Feb. 4, 1998

Related U.S. Application Data

[63] Continuation-in-part of application No. 08/387,544, Feb. 13, 1995.

[51] Int. Cl.[7] .................................................. F02D 41/26
[52] U.S. Cl. .................... 701/104; 701/106; 123/406.47; 123/675
[58] Field of Search .................................... 701/104, 106; 123/406.47, 674, 675, 478, 480, 486, 492, 493; 706/23, 31

[56] References Cited

U.S. PATENT DOCUMENTS

| | | | |
|---|---|---|---|
| 5,410,477 | 4/1995 | Ishii et al. .................................. | 701/48 |
| 5,479,571 | 12/1995 | Parlos et al. ............................... | 706/25 |
| 5,542,403 | 8/1996 | Borland et al. ............................ | 123/686 |
| 5,584,277 | 12/1996 | Chen et al. ................................ | 123/480 |
| 5,781,700 | 7/1998 | Puskorius et al. ......................... | 706/14 |

OTHER PUBLICATIONS

Joseph R. Asik, Jennifer M. Peters, Garth M. Meyer, and Donald X. Tang, Ford Motor Co.;*Transient A/F Estimation and Control Using a Neural Network*; International Congress & Exposition, Detroit, Michigan, Feb. 24–27, 1997, SAE Technical Paper Series 9070619.

*Primary Examiner*—Andrew M. Dolinar
*Attorney, Agent, or Firm*—Mark P. Calcaterra

[57] ABSTRACT

A system and method for use in a motor vehicles is disclosed for calculating a fuel multiplier during transient engine operation. The fuel multiplier modifies the amount of fuel released from a fuel actuator into an engine. The fuel control system uses neural network logic to establish the fuel multiplier. The neural network logic involves taking inputs from engine sensors, processing the inputs through an input layer, a hidden layer and an output layer resulting in a fuel multiplier.

11 Claims, 6 Drawing Sheets

NEURAL NETWORK BASED TRANSIENT FUEL CONTROL METHOD

This is a continuation-in-part of United States patent application No. 08/387,544 filed Feb. 13, 1995.

BACKGROUND OF THE INVENTION

1. Field of the Invention

The present invention relates generally to a methodology of transient fuel control for an internal combustion engine in a motor vehicle and, more specifically, to a neural network based transient fuel control method for an internal combustion engine in a motor vehicle.

2. Description of the Related Art

A motor vehicle is typically powered by an internal combustion engine which generally operates in two modes, steady state and transient. A steady state mode could be characterized by maintaining the vehicle at a constant engine speed and load, whereby the power demands on the engine do not fluctuate. In contrast, a transient mode could be characterized by driving the vehicle under varying condition,s such as accelerating, decelerating, or climbing a grade, whereby the power demands are continuously changing.

Precise metering of the amount of fuel and air delivered to the engine is necessary to achieve the desired combustion as well as acceptable vehicle emissions. It is more difficult to maintain this mixture, known as the air/fuel ratio, when the vehicle is operating in a transient mode. For example, when the vehicle is accelerating, fuel demands increase to meet increased power needs. Conversely, when the vehicle is decelerating, fuel demands decrease to meet decreased power requirements. At steady state, fuel demands remain constant.

Traditionally, an engine controller receives inputs from a variety of sensors providing information regarding vehicle operating conditions such as engine speed, throttle position, and spark advance. The controller processes the information, determines the requisite amount of air and fuel, and relays this information to a fuel actuator (e.g., a fuel injector), which adjusts the fuel flow rate to provide the precise amount of fuel to the engine. One method of determining the amount of fuel is through the use of look-up tables within the controller containing information regarding the amount of fuel required during certain vehicle operating conditions, including transient and steady state modes. The information contained within the tables is experimentally derived from a combination of vehicle testing and engineering experience. This process can be time consuming and costly.

SUMMARY OF THE INVENTION

It is, therefore, one object of the present invention to provide a neural network based system and method for controlling fuel delivered to an internal combustion engine during transient driving conditions.

It is another object of the present invention to provide a fuel control system utilizing neural network technology to establish a fuel multiplier during transient modes.

It is yet another object of the present invention to provide a more precise method of determining fuel delivery to an internal combustion engine during transient modes.

It is a further object of the present invention to provide an improvised method for fuel control for a new motor vehicle.

To achieve the foregoing objects, the present invention is a neural network based system and method for controlling fuel flow in a vehicle fuel control system operating in a transient mode. The vehicle fuel control system comprises a plurality of inputs for detecting vehicle conditions, including engine speed, manifold absolute pressure, throttle position, AIS motor position, oxygen, and spark advance position, and a neural network based controller for calculating a fuel multiplier based on the inputs, such that the fuel multiplier controls fuel flow in the vehicle fuel control system. This neural network based controller comprises an input node for each of the input sensors, for normalizing each of the inputs and for multiplying each of the inputs by an input weight. Two hidden nodes receive and sum the output from each of the input nodes into an intermediate output, and then a hyperbolic tangent function for each hidden node receives this intermediate output and transmits a hidden layer output. Next, an output node receives the hidden layer output from each of the hidden nodes, multiplies each of these hidden layer outputs by an output weight resulting in a weighted output, and sums the weighted output into a summed output, before an output hyperbolic tangent function receives this summed output, transmits an output layer output and denormalizes the output layer output into the fuel multiplier.

One advantage of the present invention is that a neural network based transient fuel control system and method is provided for an internal combustion engine. Another advantage of the present invention is that the design method optimized the inputs and network topology used to implement the neural network fuel control system. Yet another advantage of the present invention is that the method improves the development cycle for a new vehicle since testing time is decreased and there is increased commonality between different engine types.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
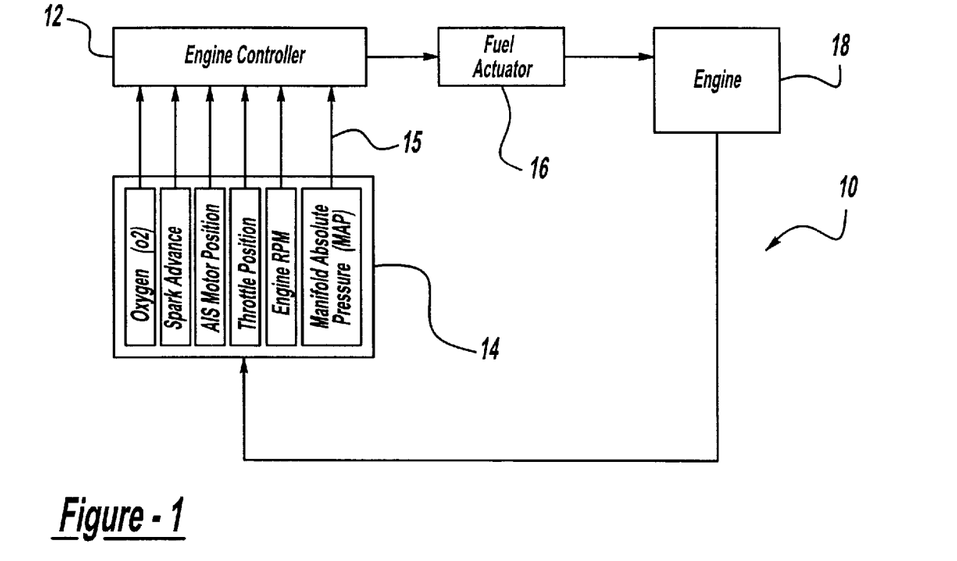
FIG. 1 is a system block diagram of a vehicle fuel control system.

FIG. 1 illustrates a vehicle fuel control system 10 is shown for a motor vehicle such as an automotive vehicle (not shown). The system 10 includes an engine controller 12 containing hardware and software necessary to control air/fuel ratio, spark advance, exhaust gas recirculation and other engine control tasks. The engine controller 12 receives information from a number of sensors 14 which may include, but are not limited to oxygen, throttle position, manifold absolute pressure (MAP), and engine speed (RPM), as well as computes additional information, such as spark advance position and automatic idle speed (AIS) motor position, from some of this detected information.

Based on some of this information, the engine controller 12 then sends a signal to a fuel actuator 16 varying the fuel actuator's pulsewidth to adjust the delivery of fuel from the fuel actuator 16 into an internal combustion engine 18 in an amount necessary to achieve a predetermined air/fuel ratio.

Figure 2:
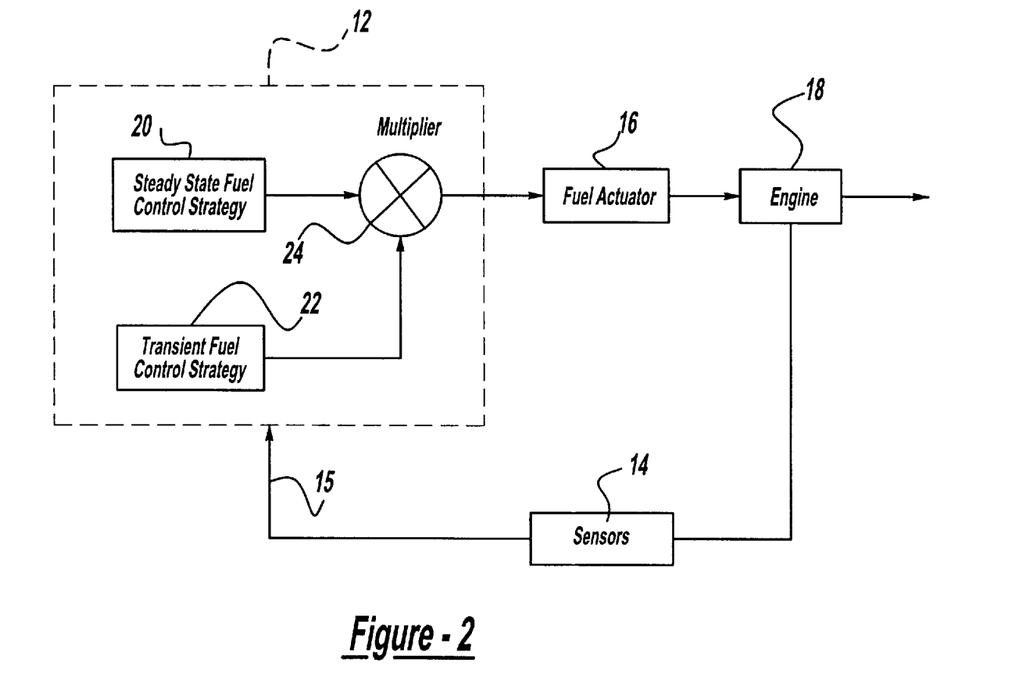
FIG. 2 is a system block diagram of a typical vehicle fuel control strategy using a look-up table approach.

Referring to FIG. 2, a typical vehicle fuel control strategy is shown within the engine controller 12. The engine controller 12 receives inputs 15 from the sensors 14, determines whether the engine 18 is operating in a steady state mode 20 or a transient mode 22, and calculates a fuel multiplier 24. Typically, the fuel multiplier 24 is based on three inputs (e.g., manifold absolute pressure, throttle position and AIS motor position) and derived from a look-up table stored in memory of the engine controller 12 as is well known in the art. The fuel multiplier 24 is then used to calculate the final fuel value, which then modifies the fuel flow through the fuel actuator 16.

Figure 3:
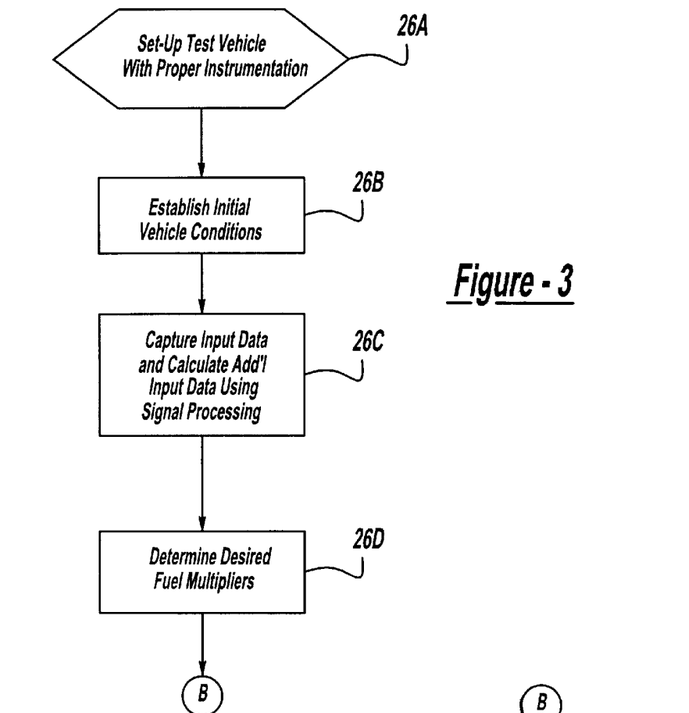
FIGS. 3, 4 and 5 are flowcharts of the design process for implementing a neural network based vehicle fuel control system of the present invention.
Figure 4:
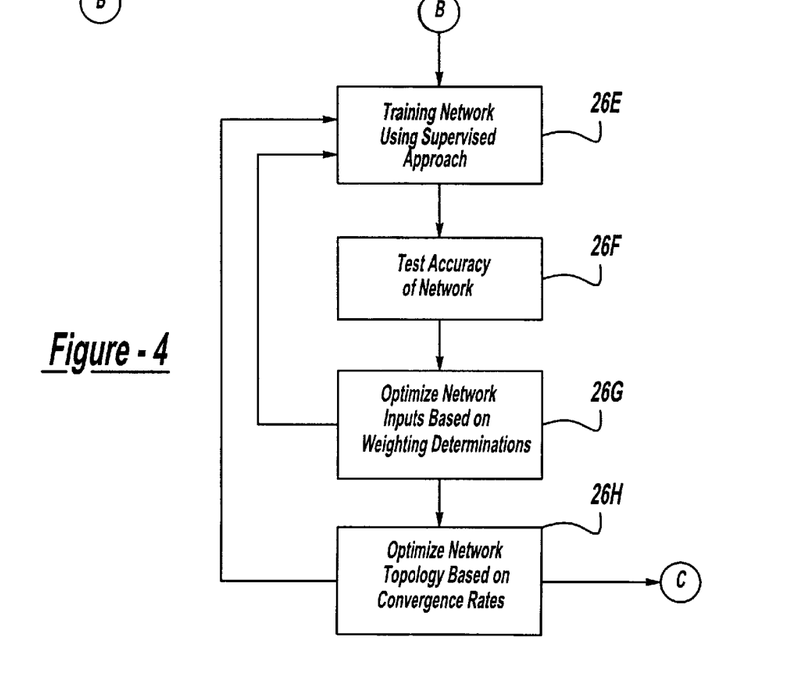
Figure 5:
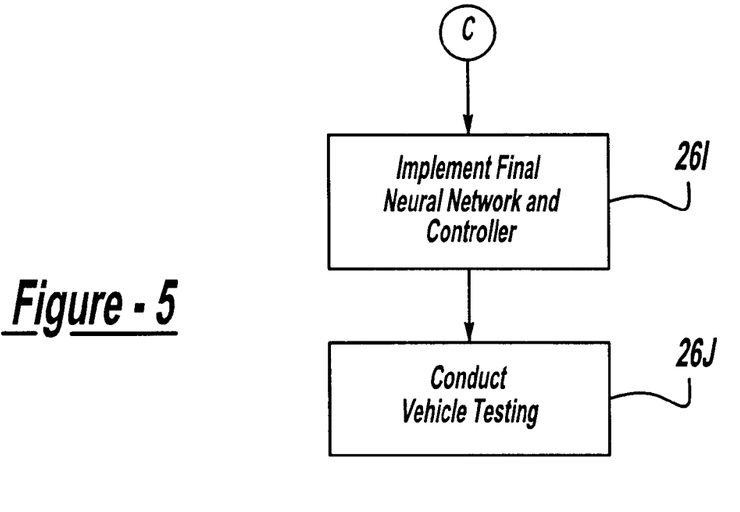

According to the present invention, a method for designing a neural network based fuel control system for controlling fuel flow to an engine of a motor vehicle is shown in FIGS. 3–5. In FIG. 3, the design process begins by equipping 26A a test vehicle with a non-production instrumentation (i.e., a linear exhaust oxygen sensor) for calibrating the desired neural network output. As will be apparent to one skilled in the art, the test vehicle will be comprised of numerous production and non-production instrumentation depending upon the design project. To establish initial conditions 26B, current transient fuel control algorithms (i.e., look-up table approach) are disabled, but steady state fuel control algorithms remain enabled.

Input data is captured/acquired 26C by using a combination of sensors, including (but not limited to) an engine speed sensor, a manifold absolute pressure sensor, a throttle position sensor, an oxygen sensor, charge temperature sensor, and an engine coolant temperature sensor. Spark advance position and AIS motor position are additional inputs that are computed by the controller. Each set of input data represents a particular state (or condition) of the engine. This input data may be acquired during Federal emission tests that include both city and highway driving cycles, and thus represent transient conditions of the vehicle's operation. Signal processing may be performed on input sensor data to create calculated input data (e.g., a first or second derivative of engine speed, manifold absolute pressure, and throttle position) and the network's output (or its derivative) may also be feedback as input data.

Next, the desired fuel multiplier is calculated 26D for each set of input data. The current fuel pulsewidth multiplier necessary to compensate the steady state fuel pulsewidth at the current engine state is calculated based on the actual fuel/air ratio resulting from the current steady state fuel pulsewidth as follows:

$$\text{Desired Fuel Multiplier } (t) = \frac{\text{Stoichiometric Fuel / Air Ratio}}{\text{Actual Fuel / Air Ratio } (t + tf)}$$

where (tf)=Flow Delay Time (RPM, Sensor Response Time & Location)

if lean condition exists, then fuel multiplier(t)>1 if stoichiometric condition exists, then multiplier(t)=1 if rich condition exists, then fuel multiplier(t)<1

The actual fuel/air ratio is measured at a time (tf) after the current combustion event by placing a linear oxygen sensor downstream (i.e., in the exhaust system) from the engine. Therefore, the desired fuel multiplier is determined by mapping a previous (input) engine state to the actual (measured) fuel/air ratio. This flow delay time (tf) is determined based on engine speed, oxygen sensor response time and location (i.e., distance) of oxygen sensor from the engine as is well known in the art.

Initially, a basic neural network topology (i.e., single layer, feedforward network) is implemented in FIG. 4. Supervised training 26E using at least a portion of the acquired and calculated input data and corresponding desired fuel multiplier is employed to configure this first neural network. Training is an experimental methodology for learning what constant values should be used and takes place during the development phase of designing a new motor vehicle. Backpropagation is the preferred training method, although other training methods may also be used in establishing network weights. The remainder of the input data and corresponding desired fuel multipliers are used to test 26F the accuracy of this first neural network. During this initial training and testing, each and every acquired and calculated input serves as an input into this first neural network.

Network inputs are optimized 26G based on the weighting determination from the neural network training. Weighting values fall within a range around 0 (e.g., between −1.5 and 1.5), such that the farther a weight is from 0 the more that input correlates to (or contains information about) the desired fuel multiplier. In general, inputs with a distinctive grouping or cluster of weighting values were identified as the preferred inputs from the particular set of inputs being tested. Inputs with weighting values within an order of magnitude of each other (based on percentage difference in their absolute weighting values) were grouped together; whereas inputs outside this grouping (e.g., with weighting values close to 0) were not chosen. This input optimization technique was used with a variety of network topologies to eliminate network dependencies. The identified cluster of inputs are then used to reconfigure and retest the current (or variation of the) network topology. Engine speed (RPM), manifold absolute pressure, throttle position, AIS motor position, oxygen sensor, and spark advance position were identified as the optimal inputs for controlling transient fuel flow to an engine.

To refine the design process, additional topologies are implemented, and then the steps of training, testing and input optimization are repeated for each topology. Variations in the network topologies that may be implemented, include adding hidden layer(s), varying the number of nodes in each hidden layer, using different activation functions (i.e., sigmoidal function, constant value, etc.), and employing a recurrent network approach. An optimal network topology (as seen in FIG. 6) was selected 26H based on neural network convergence rates and the accuracy of network output in relation to desired fuel multipliers.

Referring to FIG. 5, once an optimal network topology has been selected for the optimal grouping of inputs, a final neural network is implemented 26I in an embedded controller using modular programming structure. Although off-line training was employed to reduce the implementation requirements, one skilled in the art will recognize that on-line or real-time training could be used to allow for adaptive learning of new engine operating conditions. Finally, vehicle testing 26J is conducted using this neural network based fuel control system to evaluate vehicle drivability and compliance with Federal emission standards.

Figure 6:
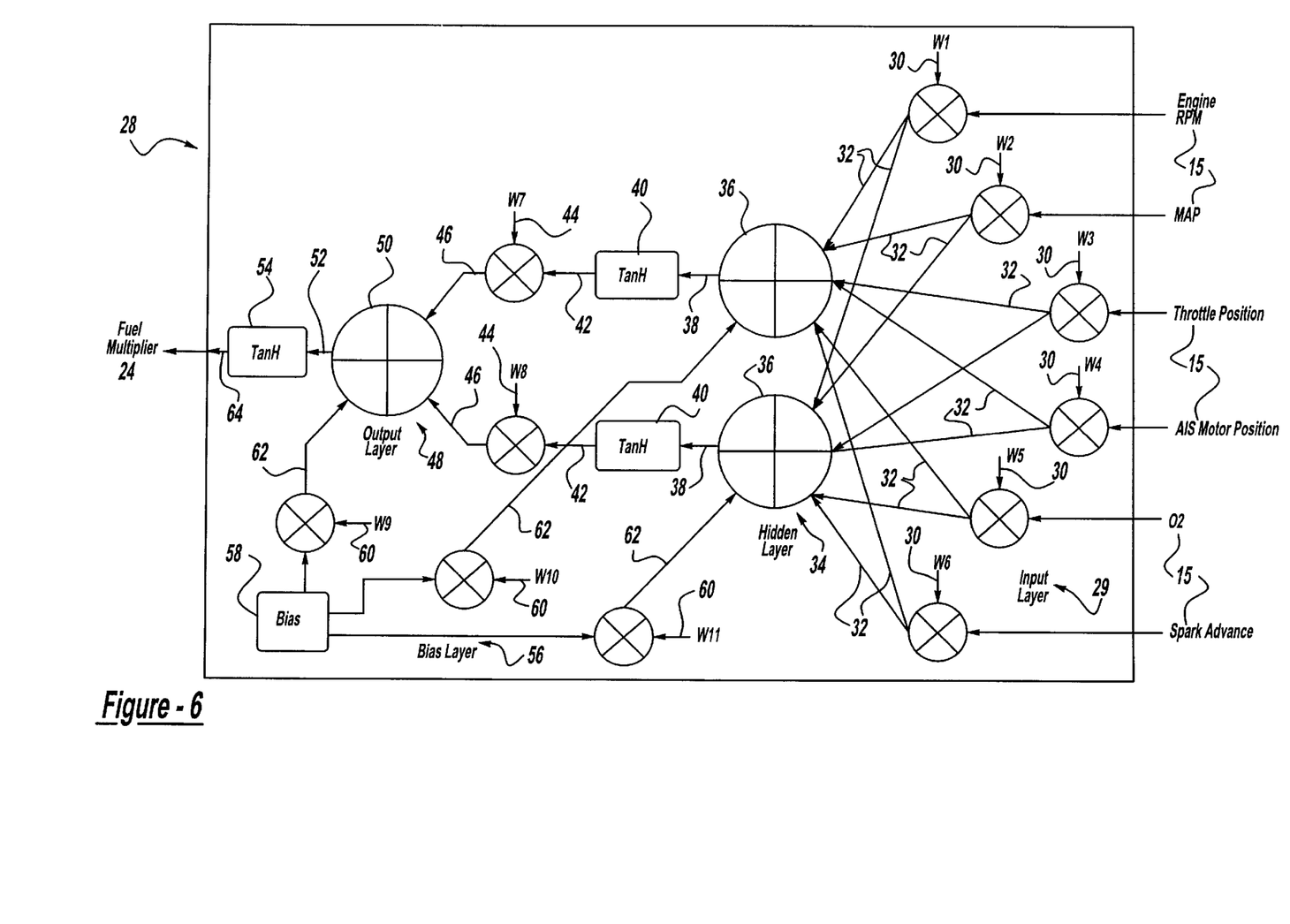
FIG. 6 is a system block diagram of neural network logic for the vehicle fuel control system of the present invention.

Through this iterative design approach, a preferred embodiment of a neural network based fuel control system is shown in FIG. 6. The neural network based fuel control system and method uses a neural network logic system, generally shown at 28, to provide logic in an organized manner and for manipulating data to establish the fuel multiplier 24 when the engine 18 is operating in a transient mode. This neural network logic system 28 is programmed into the engine controller 12.

In the neural network logic system 28, an input layer 29 receives inputs 15 from the sensors 14. Engine speed (RPM), manifold absolute pressure, throttle position, AIS motor position, oxygen sensor, and spark advance position are the preferred inputs as identified through the optimization process. These inputs 15 are each normalized, and then multiplied by an input layer weight 30 (W1 through W6) to obtain an input layer output 32. In this particular example, there are two input layer weights 30 for each input 15, corresponding to a number of hidden layer nodes 36. However, there could be more or less, depending on design criteria. Each input layer weight 30 is a constant value derived from training.

The input layer output 32 is then processed in a hidden layer 34. This process includes summing together the input layer output 32 within each hidden layer node 36, resulting in an intermediate output 38 for each hidden layer node 36. In this particular example, there are two (2) hidden layer nodes 36, although there could be more or fewer nodes depending upon the need. The process also includes a hyperbolic tangent (TanH) transfer function 40 whereby the hyperbolic tangent of each intermediate output 38 from each hidden layer node 36 is taken resulting in an hidden layer output 42.

The hidden layer output 42 is then processed in an output layer 48 by multiplying the hidden layer output 42 by a corresponding output layer weight 44 (W7, W8), and a resulting weighted output 46 is summed together in an output layer node 50. A resulting summed output 52 from the output layer mode 50 is then put through an output hyperbolic tangent transfer function 54 whereby the hyperbolic tangent is taken. The resulting value is an output layer output 64, which is then denormalized to become the fuel multiplier 24.

Concurrently, a bias layer 56, which provides a reference value for the nodes, feeds the nodes in the output layer 48 and the hidden layer 34. An arbitrarily chosen bias value 58, in this example one (1), is multiplied by a bias weight 60 (W9, W10, W11) resulting in an bias layer output 62. In another embodiment, there may be a unique bias weight 60 corresponding to each node, which is learned using a method such as training. The bias layer output 62 then becomes an input to the corresponding hidden layer node 50.

Figure 7A:
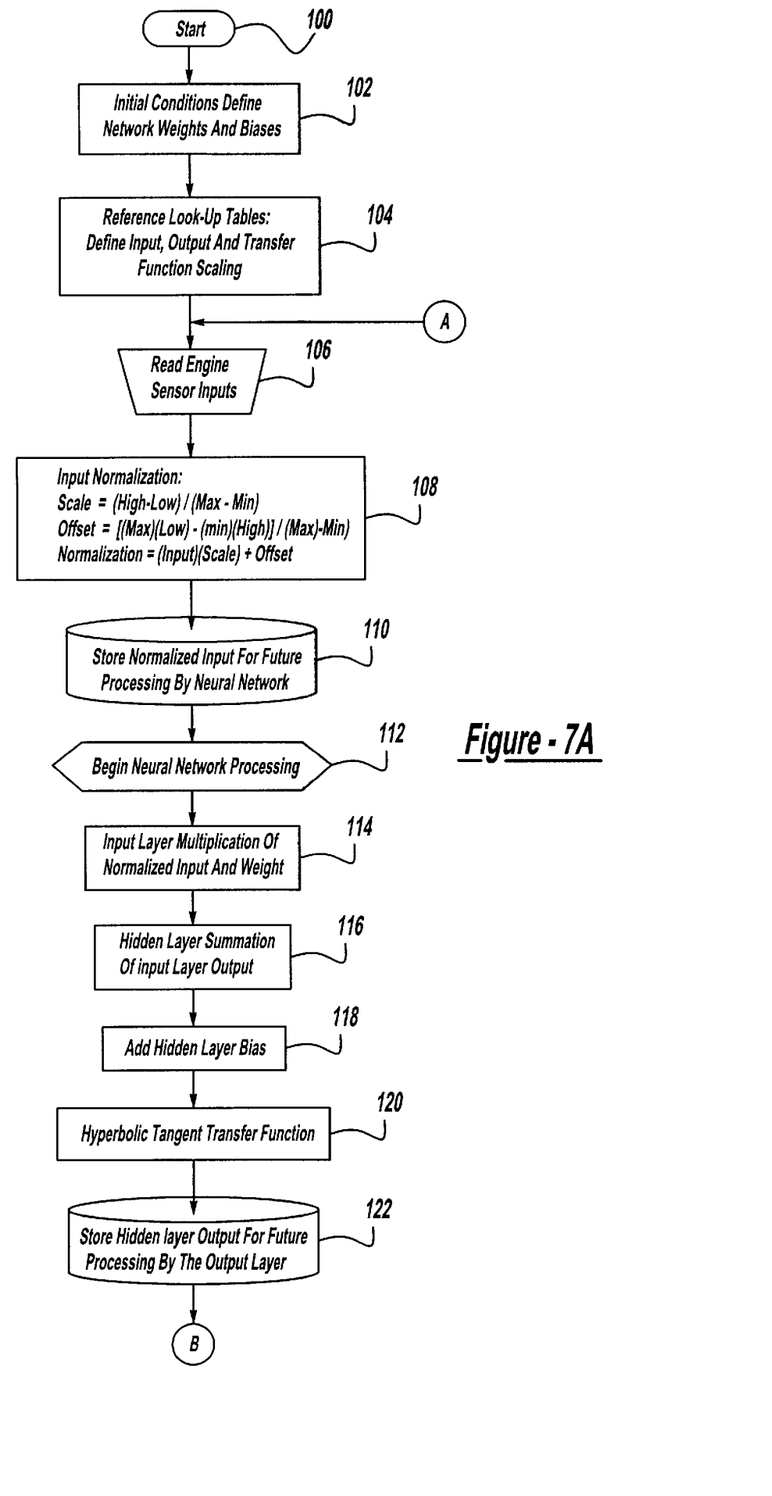
FIGS. 7A and 7B are flowcharts of the neural network methodology for the vehicle fuel control system of the present invention.
Figure 7B:
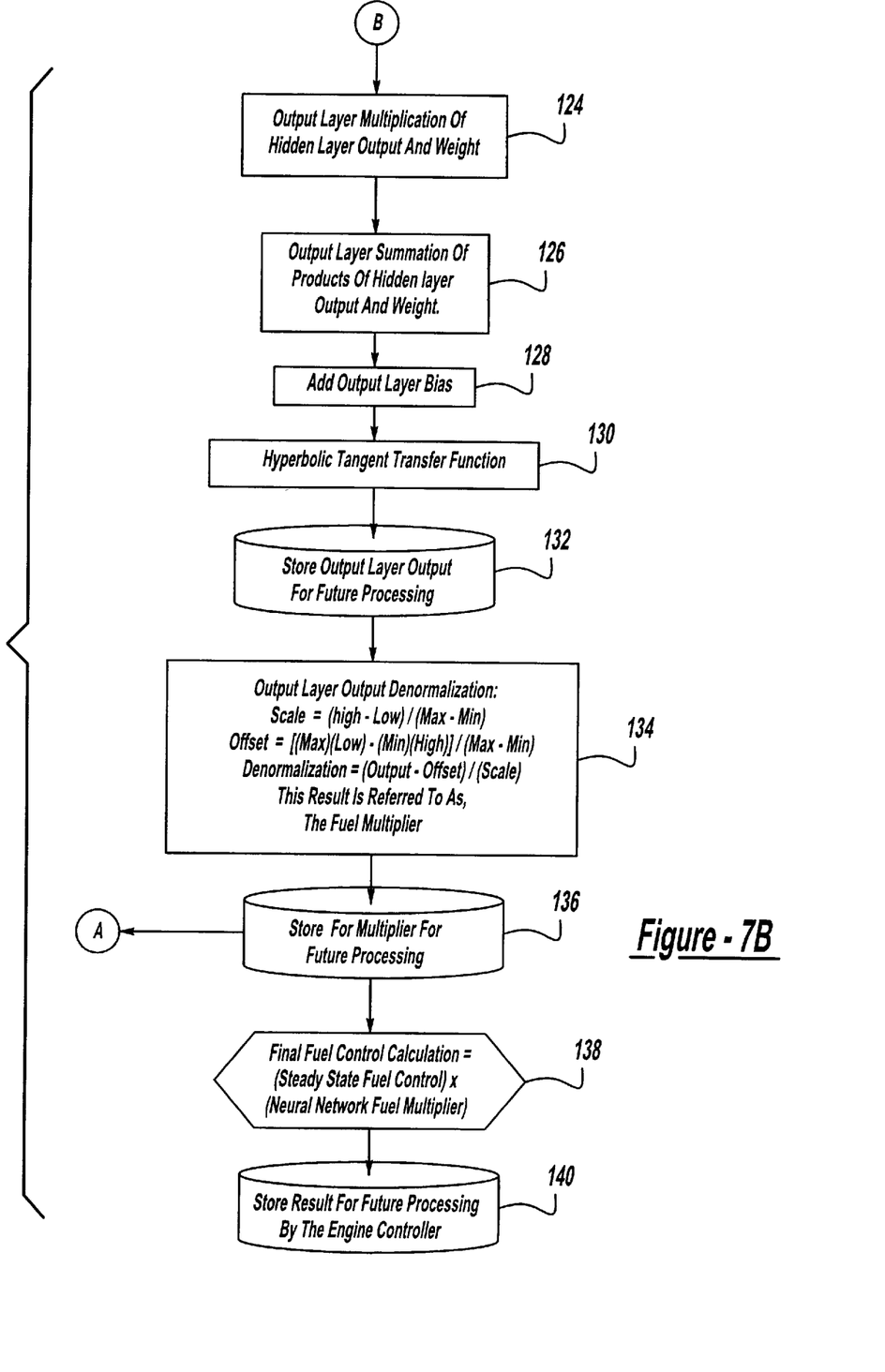

Referring for FIGS. 7A and 7B, a flowchart of the neural network based method, according to the present invention, is shown. In FIG. 7A, the methodology begins or starts in block 100 an occurs after the motor vehicle is keyed ON. The methodology advances to block 102 where initial conditions are established such as input layer weight 30, output layer weight 44 and bias weight 60. The methodology progresses to block 104 where further initial conditions are established, such as defining the input, output and transfer function scaling by the hyperbolic tangent transfer functions. After block 104, the rest of the methodology occurs on a periodic basis. It should be appreciated that the methodology can be trained to recognize when the vehicle is operating in a steady state mode, and output a fuel multiplier equal to a constant value such as 1. The methodology then advances to block 106 and reads engine sensor input 15 from a sensor 14. The methodology progresses to block 108, where the sensor input 15 is normalized for a data point to be within the range −1.0 to +1.0. A typical normalization calculation to obtain a normalized input is as follows:

Scale=(high−low)/(max−min)

Offset=[(max)(low)−(min)(high)]/(max−min)

Normalization=(input)(scale)+offset

The methodology advances to block 110 where the normalized input is stored in random access memory (RAM) in the engine controller 12 for future use.

After block 110, the methodology advances to block 112 where the neural network processing begins and continues to block 114. In block 114, the normalized input is multiplied by an input layer weight 30 resulting in an input layer output 32. The methodology then advances to block 116, the hidden layer 34, where the input layer output 32 is summed together. The methodology advances to block 118 where the bias layer output 62 is added to the input layer output 32 resulting in an intermediate output 38 for each hidden layer node 36. The methodology advances to block 120 where the intermediate output 38 is put through a hyperbolic tangent transfer function resulting in a hidden layer output 42. The methodology advances to block 122 and this value is stored in the engine controller 12 for future processing.

After block 122, the methodology advances to block 124 in Figure 7B. In block 124, the output layer weight 44 is multiplied by the hidden layer output 42 resulting in a weighted output 46 for each. The methodology then advances to block 126 and the weighted output 46 is summed together. The methodology advances to block 128 where the bias layer output 62 is added to the weighted output 46 resulting in a summed output 52.

After block 128, the methodology advances to block 130 where the summed output 52 is put through an output hyperbolic transfer function 54 by taking the hyperbolic tangent of the summed output 52 resulting in an output layer output 64. The methodology advances to block 132 and the output layer 64 is stored for future processing. The methodology then advances to block 134 and the output layer 64 is denormalized for use as the fuel multiplier 24. The denormalization calculation is as follows:

Scale=(high−low)/(max−min)

Offset=[(max)(low)−(min)(high)]/(max−min)

Denormalization=(output−offset)/(scale)

The methodology continues to block 136 where the fuel multiplier 24 is stored in the engine controller 12 until needed. The methodology then returns to block 106.

When the fuel multiplier 24 is called for by the engine controller 12, the methodology calculates the final fuel value in block 138 as:

Final Fuel Value=(Steady State Fuel Control)*(Fuel Multiplier)

The methodology then advances to block 140 where the final fuel value is stored in the engine controller 12 until needed.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced otherwise than as specifically described.

What is claimed is:

1. A vehicle fuel control system for controlling a fuel flow to an engine of a motor vehicle operating in a transient mode, comprising:

a plurality of input sensors for detecting an engine state, including a speed sensor, a manifold absolute pressure sensor, a throttle position sensor, an AIS motor position sensor, an oxygen sensor, and a spark advance position sensor;

a neural network for calculating a fuel multiplier based on input from each of said plurality of sensors, whereby the fuel multiplier controls fuel flow in the vehicle fuel control system; and a fuel actuator for receiving the fuel multiplier and adjusting the fuel flow to the engine of the vehicle.

2. The vehicle fuel control system of claim 1 further comprising a means for training said neural network using input data from each of said plurality of sensors and a desired fuel multiplier, where the desired fuel multiplier is determined by measuring an fuel/air ratio which corresponds to the input data from each of said plurality of input sensors.

3. The vehicle fuel control system of claim 1 wherein said neural network includes:

an input node for each of said input sensors for normalizing each of said inputs and multiplying each of said inputs by an input weight;

two hidden nodes receiving and summing the output from each of said input nodes into an intermediate output;

a hyperbolic tangent function for each hidden node receiving said intermediate output and transmitting a hidden layer output;

an output node receiving the hidden layer output from each of said hidden nodes, multiplying each of said hidden layer outputs by an output weight resulting in a weighted output, and summing said weighted output into a summed output; and a output hyperbolic tangent function receiving said summed output, transmitting an output layer output and denormalizing said output layer output into said fuel multiplier.

4. The vehicle fuel control system of claim 3 wherein said neural network means further comprises a bias layer for providing a reference value to each of the two hidden nodes and the output node.

5. A vehicle fuel control method for controlling fuel flow to an engine of a motor vehicle operating in a transient mode, comprising the steps of:

determining engine speed, manifold absolute pressure, throttle position, AIS motor position, oxygen, and spark advance position using a plurality of sensors, thereby determining an engine state;

determining a fuel multiplier using a neural network having as inputs engine speed, manifold absolute pressure, throttle position, AIS motor position, oxygen, and spark advance position; and using the fuel multiplier to control fuel flow in the vehicle fuel control system.

6. The vehicle fuel control method of claim 5 wherein the step of using the fuel multiplier further comprises adjusting a fuel actuator to control the fuel flow into the engine of the vehicle.

7. The vehicle fuel control method of claim 5 further comprising the step of training said neural network using input data from each of said plurality of sensors and a desired fuel multiplier, where the desired fuel multiplier is determined by measuring an actual fuel/air ratio which corresponds to the input data from each of said plurality of input sensors.

8. The vehicle fuel control method of claim 5 further comprising the step of normalizing each input from said plurality of sensors prior to being input into said neural network.

9. The vehicle fuel control method of claim 5 wherein said neural network includes:

an input node for each of said input sensors for multiplying each of said inputs by an input weight;

two hidden nodes receiving and summing the output from each of said input nodes into an intermediate output;

a hyperbolic tangent function for each hidden node receiving said intermediate output and transmitting a hidden layer output;

an output node receiving the hidden layer output from each of said hidden nodes, multiplying each of said hidden layer outputs by an output weight resulting in a weighted output, and summing said weighted output into a summed output; and a output hyperbolic tangent function receiving said summed output, and transmitting an output layer output.

10. The vehicle fuel control method of claim 9 further comprising the step of denormalizing said output layer output into said fuel multiplier, and multiplying said fuel multiplier by a steady state fuel control value resulting in a final fuel value.

11. The vehicle fuel control method of claim 9 wherein said neural network further comprises a bias layer for providing a reference value to each of the two hidden nodes and the output node.

* * * * *